United States Patent [19]

Hefner, Jr. et al.

[11] Patent Number: 4,611,015
[45] Date of Patent: Sep. 9, 1986

[54] POLYMER CONCRETE COMPOSITIONS CONTAINING WATER ABSORBENT POLYMERS

[75] Inventors: Robert E. Hefner, Jr., Lake Jackson; Deborah I. Haynes, Freeport, both of Tex.

[73] Assignee: The Dow Chemical Company, Midland, Mich.

[21] Appl. No.: 681,348

[22] Filed: Dec. 13, 1984

[51] Int. Cl.[4] .......................... C08K 3/34; C08K 3/36
[52] U.S. Cl. .................................. 523/408; 523/410; 523/466; 523/467; 523/523; 523/526; 524/493; 524/513; 524/514; 524/517; 524/518; 524/521; 524/523; 524/531
[58] Field of Search ............... 523/408, 410, 523, 526, 523/521, 466, 467; 524/493, 513, 514, 517, 523, 518, 521, 531

[56] References Cited

U.S. PATENT DOCUMENTS

| | | | |
|---|---|---|---|
| 4,346,050 | 8/1982 | Trent et al. | 523/521 |
| 4,371,639 | 2/1983 | Muszynski | 523/512 |
| 4,375,489 | 3/1983 | Muszynski | 523/218 |
| 4,410,686 | 10/1983 | Hefner et al. | 528/298 |
| 4,524,162 | 6/1985 | Domeier | 523/438 |

*Primary Examiner*—Herbert J. Lilling
*Attorney, Agent, or Firm*—B. G. Colley

[57] ABSTRACT

Polymer concrete compositions comprising an unsaturated thermosettable resin(s) and/or ethylenically unsaturated monomer(s), an aggregate component and a water absorbent polymer are cured to provide polymer concrete with enhanced adhesion to substrates, especially wet concrete. A primer or coating composition for concrete comprising a water absorbent polymer and an unsaturated thermosettable composition is also disclosed.

6 Claims, No Drawings

POLYMER CONCRETE COMPOSITIONS CONTAINING WATER ABSORBENT POLYMERS

BACKGROUND OF THE INVENTION

This invention relates to polymer concrete compositions consisting generally of a unsaturated thermosettable resin and/or ethylenically unsaturated monomer, an aggregate component, and a water absorbent polymer composition.

Polymer concretes are well known from U.S. Pat. Nos. 4,346,050; 4,371,639; 4,375,489 and the references cited therein. The use of polymers in concrete is further reviewed in "Chemical, Polymer and Fiber Additions for Low Maintenance Highways" by Hoff et al. Noyes Data Corp. 1979 pages 467–511.

The use of the compositions of this invention have been found to strengthen the compressive bond strength of polymer concretes when used on wet or dry substrates, such as, for example, Portland cement concrete.

SUMMARY OF THE INVENTION

The invention is broadly a polymer concrete composition comprising
(A) about 2 to about 20, preferably 8 to 15 percent by weight (pbw) of an unsaturated thermosettable composition containing about 1 to about 100 percent by weight of one or more ethylenically unsaturated monomers and 0 to 99 weight percent of one or more ethylenically unsaturated resins
(B) about 97.9 to about 75, preferably 91 to 83 pbw of an aggregate, and
(C) about 0.1 to 5, preferably 1 to 2 pbw of a water absorbent polymer.

A further embodiment of the invention is a coating composition comprising
(A) about 1 to about 50, preferably 3 to about 15 pbw of a water absorbent polymer composition and
(B) about 99 to about 50, preferably 97 to about 85 pbw of an unsaturated thermosettable resin and/or ethylenically unsaturated monomer composition.

The invention provides unsaturated thermosettable resin and/or ethylenically unsaturated monomer-aggregate-absorbent polymer compositions which when cured with known catalyst systems give a polymer concrete with better compressive bonding strengths to both wet and dry substrates such as concrete and the like. The invention further provides unsaturated thermosettable resin and/or ethylenically unsaturated monomer-absorbent polymer primer or coating compositions which give improved compressive bonding strengths between cured polymer concretes and both wet and dry substrates such as concrete and the like. As an added benefit, certain of the cured polymer concrete compositions of the present invention (containing a water absorbent polymer composition) are more easily demolded from a mold when compared to the corresponding conventional cured polymer concrete (without a water absorbent polymer composition).

The polymer concrete of the present invention is especially suited for use in repair of spalled, cracked or otherwise damaged concrete runways, highways, oil-well platforms, parking structures, bridges and the like especially where the concrete surface is damp or wet. Under these conditions, the polymer concrete compositions of this invention provide enhanced adhesion to said damp or wet concrete surface. These compositions are not well suited for underwater applications.

DETAILED DESCRIPTION OF THE INVENTION

The unsaturated thermosettable resin compositions used in this invention comprise
1. unsaturated polyester or polyesteramide resins,
2. norbornyl modified unsaturated polyester or polyesteramide resins,
3. hydrocarbon modified unsaturated polyester or polyesteramide resins,
4. vinyl ester resins, or
5. mixtures of the foregoing resins.

These unsaturated resins are blended with about 1 to about 99 percent by weight and preferably 30 to 80 percent by weight, of one or more ethylenically unsaturated monomers to make up the thermosettable resin compositions.

The unsaturated polyesters used in this invention possess $\alpha,\beta$-unsaturated carboxylic acid ester groups within the polymer chains. Said unsaturated polyesters are composed of the polymerizate of a polyol, an $\alpha,\beta$-unsaturated polycarboxylic acid and, optionally, a saturated and/or aromatic polycarboxylic acid. Preparation of said unsaturated polyesters is taught by Kirk-Othmer, Encyclopedia of Chemical Technology, Vol. 18, pages 575–594 (1982) which is incorporated herein by reference. The unsaturated polyesteramides used in this invention possess amide groups within the polymer chains which are obtained by partial replacement of the polyol by a polyamine or mixture of polyamines.

The norbornyl modified unsaturated polyesters or polyesteramides used in this invention have an ester or esteramide chain, respectively, and have at least one terminal norbornyl radical. The ester chain is composed of the polymerizate of a polyol, an $\alpha,\beta$-unsaturated polycarboxylic acid and, optionally, a saturated and/or aromatic polycarboxylic acid. The ester amide chain is composed of the polymerizate of a polyol, a polyamine, an $\alpha,\beta$-unsaturated polycarboxylic acid and, optionally, a saturated and/or aromatic polycarboxylic acid. The norbornyl radical is derived from dicyclopentadiene, dicyclopentadiene monoalcohol, polycyclopentadiene, dicyclopentadiene concentrate, mixtures thereof and the like. Preparation of said norbornyl modified unsaturated polyesters and polyesteramides is taught by U.S. Pat. Nos. 4,029,848; 4,117,030; 4,167,542; 4,233,432; 4,246,367; 4,348,499; 3,360,634; 4,409,371; and 4,410,686.

Resin concrete compositions prepared using a dicyclopentadiene modified unsaturated polyester resin are taught by U.S. Pat. No. 4,228,251. Polymer concrete compositions prepared using a norbornyl modified unsaturated polyesteramide resin are taught by Ser. No. 643,571 filed Aug. 23, 1984.

Hydrocarbon modified unsaturated polyesters or polyesteramides prepared from resin oils used in this invention as well as polymer concrete compositions thereof are taught by Ser. No. 661,845 filed Oct. 17, 1984. The hydrocarbon polymers can be prepared by the following procedures.

EXAMPLE 1

Maleic anhydride (306.97 g) was added to a reactor and heated to 135° C. with stirring under a nitrogen atmosphere. Water (62.04 g) was added and immediately induced a maximum exotherm of 143° C. with the 135° C. temperature being reestablished within 5 minutes. Five minutes after the initial water addition, a commercial grade resin oil designated as Resin Oil 80 (hereinafter RO-80) and produced by The Dow Chemical Company, (115.12 g) was added to the reactor, the steam condenser was started, and nitrogen sparging was increased. A maximum exotherm of 142° C. occurred 1 minute after the initial RO-80 addition. Additional RO-80 (115.12 g) was added 15 minutes after the initial RO-80 addition, and 19 ml of water collected in the Dean Stark trap was removed and recycled to the reactor. A final portion of RO-80 (115.12 g) was added 15 minutes later. The yellow-colored slurry was held for 30 minutes at 135° C., after which time the temperature controller was set at 160° C. Thirteen minutes later, 155° C. was reached and a propylene glycol/dipropylene glycol mixture (118.72 g/209.32 g) was added to the reactor. The 160° C. temperature was achieved 12 minutes later. After 2 hours at 160° C., the temperature controller was set at 205° C., and this temperature was achieved 32 minutes later. After 2.5 hours, a total of 91.5 ml of water layer and 100.5 ml of organic material were collected in the Dean Stark trap. The reactor was cooled to 168° C. and 100 ppm of hydroquinone were added. The modified unsaturated polyester was recovered as a transparent, light yellow-colored, tacky solid with a final acid number of 27.0.

Based on this analysis, the esterified hydrocarbon reactives component (1) comprises 44.29 percent by weight, the ethylenically unsaturated aromatic hydrocarbon reactives component (2) comprises 23.80 percent by weight and the nonreactive hydrocarbons component comprises the balance by difference.

EXAMPLE 2

Maleic anhydride (3.13 moles, 306.97 g) was added to a reactor and heated to 135° C. under a nitrogen atmosphere with stirring. Water (3.443 moles, 62.04 g) was added and immediately induced a maximum exotherm of 143° C. with the 135° C. temperature being reestablished 2 minutes later. Five minutes after the initial water addition, RO-80 (115.12 g) was added to the reactor. The RO-80 used was the same as that used in Example 8, except that partial polymerization of the ethylenically unsaturated aromatic hydrocarbon reactives component of the resin oil was completed prior to use of the resin oil herein by addition of 0.23 percent by weight azobisisobutyronitrile followed by reaction for 2 hours at 70° C. followed by addition of 0.12 percent by weight benzoyl peroxide followed by reaction for 1 hour at 100° C. A maximum exotherm of 141° C. occurred 1 minute later. Air cooling of the reactor exterior reduced the reactor temperature to 135° C. A second portion of RO-80 (115.12 g) was added 15 minutes after the initial RO-80 addition. A final portion of RO-80 (115.12 g) was added 15 minutes later and the 135° C. reaction temperature was reachieved 2 minutes later. After 30 minutes, a propylene glycol/dipropylene glycol mixture (1.56 moles, 118.72 g/1.56 moles, 209.32 g) was added to the reactor and the steam condenser was started. Nitrogen sparging was increased to 0.5 liter per minute, and the temperature controller was set at 160° C. The 160° C. temperature was reached 19 minutes later. After 2 hours at 160° C., the temperature controller was set at 205° C. and this temperature was achieved 25 minutes later. After 14.0 hours, a total of 103.5 ml of water layer and 82 ml of organic material were collected in the Dean Stark trap. The reactor was cooled to 165° C. and 100 ppm of hydroquinone were added. The modified unsaturated polyester was recovered as a transparent, light yellow-colored solid with a final acid number of 11.5.

EXAMPLE 3

Maleic anhydride (3.13 moles, 306.97 g) was added to a reactor and heated to 80° C. under a nitrogen atmosphere with stirring. Water (3.443 moles, 62.04 g) was added and immediately induced a maximum exotherm of 126° C. with a 120° C. temperature being established within 5 minutes. Fifteen minutes after the initial water addition, indene (0.40 mole, 46.46 g) was added to the reactor and the temperature controller was set at 135° C. This temperature was achieved 12 minutes later. The indene used was the same as that used in Examples 2, 3, 4 and 5. Additional indene (0.40 mole, 46.46 g) was added 15 minutes after the initial indene addition. A final portion of indene (0.40 mole, 46.46 g) was added 15 minutes later. The yellow colored slurry was held for 30 minutes at 135° C., after which time propylene glycol (3.10 moles, 235.91 g) and piperazine (0.312 mole, 26.88 g) were added to the reactor. The steam condenser was started, nitrogen sparging was increased to 2 liters per minute and the temperature controller was set at 160° C. The 160° C. temperature was achieved 20 minutes later. After 2.0 hours at 160° C., the temperature controller was set at 205° C. and this temperature was achieved 11 minutes later. After 4.0 hours, a total of 111.5 ml of water layer and 8.5 ml of organic material were collected in the Dean Stark trap. The reactor was cooled to 165° C. and 100 ppm of hydroquinone were added. The polyesteramide was recovered as a transparent, light amber-colored, solid with a final acid number of 29.2.

EXAMPLE 4

Maleic anhydride (5.00 moles, 490.3 g) was added to a reactor and heated to 100° C. under a nitrogen atmosphere with stirring. Water (5.50 moles, 99.11 g) was added and induced a maximum exotherm of 139° C. two minutes later. Cooling reduced the reactor temperature to 130° C. after an additional 5 minutes. Fifteen minutes after the initial water addition, a commercial grade of resin oil designated as Resin Oil 60 (hereinafter RO-60) and produced by The Dow Chemical Company (288.1 g) was added to the reactor. Capillary gas chromatographic-mass spectroscopic analysis of the RO-60 demonstrated the following composition: 64.36 weight percent esterifiable hydrocarbon reactives composed of cyclopentadiene (2.95 percent), butadiene/cyclopentadiene codimers (3.96 percent), dicyclopentadiene (45.81 percent), indene (4.37 percent), isoprene/cyclopentadiene codimer (1.49 percent) and methylcyclopentadiene/cyclopentadiene codimer (5.78 percent); 16.14 weight percent ethylenically unsaturated aromatic hydrocarbon reactives composed primarily of styrene and less than 1 percent vinyl toluene; and 19.50 weight percent nonreactive hydrocarbons composed of toluene (0.12 percent), naphthalene (0.30 percent) xylenes, ethylbenzenes, trimethylbenzenes, methylethylbenzenes, and the like. A maximum exotherm of 143° C. occurred 2 minutes later. Cooling reduced the reactor temperature to 130° C. A second portion of Resin Oil 60 (288.1 g) was added 15 minutes after the initial RO-60 addition. A final portion of RO-60 (288.1 g) was added 15 minutes later, and the 130° C. reaction temperature was reachieved 3 minutes later. Thirty minutes after the addition of the final portion of RO-60, propylene glycol (3.00 moles, 228.3 g) was added to the reactor, the steam condenser was started, nitrogen sparging was increased to 0.75 liter per minute and the temperature controller was set at 160° C. The 160° C. temperature was achieved 26 minutes later. After 2 hours at 160° C., the temperature controller was set at 205° C. and this temperature was achieved 14 minutes later. After 10 hours, a total of 115 ml of water layer and 174 ml of organic material were collected into the Dean Stark trap. The reactor was cooled to 165° C. and 100 ppm of hydroquinone were added. The modified unsaturated polyester was recovered as a transparent, light yellow-colored solid with a final acid number of 30.1. Mass balance calculations verified that essentially all of the hydrocarbon reactives and reactive ethylenically unsaturated aromatic hydrocarbons were incorporated into the polyester while in excess of 95 percent of the nonreactive hydrocarbons were recovered into the Dean Stark trap.

EXAMPLE 5

Maleic anhydride (5.00 moles, 490.3 g) was added to a reactor and heated to 100° C. under a nitrogen atmosphere with stirring. Water (5.50 moles, 99.11 g) was added and induced a maximum exotherm of 138° C. one minute later. Cooling reduced the reactor temperature to 130° C. after an additional 3 minutes. Fifteen minutes after the initial water addition, a commercial grade of resin oil designated as RO-60 (288.1 g) was added to the reactor. The composition of the RO-60 was identical to that delineated in Example 11. A maximum exotherm of 143° C. occurred 2 minutes later. Cooling reduced the reactor temperature to 130° C. A second portion of RO-60 (288.1 g ) was added 15 minutes after the initial RO-60 addition. A final portion of RO-60 (288.1 g) was added 15 minutes later and the 130° C. reaction temperature was reachieved 3 minutes later. Thirty minutes after the addition of the final portion of RO-60, ethylene glycol (3.00 moles, 186.18 g) was added to the reactor, the steam condenser was started, nitrogen sparging was increased to 0.75 liter per minute, and the temperature controller was set at 160° C. The 160° C. temperature was achieved 28 minutes later. After 2 hours at 160° C., the temperature controller was set at 205° C. and this temperature was achieved 26 minutes later. After 8 hours, a total of 100 ml of water layer and 127 ml of organic material were collected in the Dean Stark trap. The reactor was cooled to 165° C. and 100 ppm of hydroquinone were added. The modified unsaturated polyester was recovered as a transparent, light yellow-colored solid with a final acid number of 31.7. Essentially all of the hydrocarbon reactives and reactive ethylenically unsaturated aromatic hydrocarbons were incorporated into the polyester while the bulk of the nonreactive hydrocarbons were recovered in the Dean Stark trap as determined by mass balance calculations.

EXAMPLE 6

Maleic anhydride (2.22 moles, 217.91 g) was added to a reactor and heated to 100° C. under a nitrogen atmosphere with stirring. Water (2.44 moles, 44.05 g) was added and induced a maximum exotherm of 136° C. two minutes later. Cooling reduced the reactor temperature to 130° C. after an additional 3 minutes. Fifteen minutes after the initial water addition, a commercial grade of resin oil designated as RO-60 (128.03 g) was added to the reactor. The composition of the Resin Oil 60 was identical to that delineated in Example 11 except that partial polymerization of the ethylenically unsaturated aromatic hydrocarbon reactives component of the resin oil was completed prior to the use of the resin oil herein by addition of 0.10 percent by weight azobisisobutyronitrile followed by reaction for 19.5 hours at 60° C. A maximum exotherm of 144° C. occurred 2 minutes later. Cooling reduced the reactor temperature to 130° C. A second portion of RO-60 (128.03 g) was added 15 minutes after the initial RO-60 addition. A final portion of RO-60 (128.03 g) was added 15 minutes later and the 130° C. reaction temperature was reachieved 2 minutes later. Thirty minutes after the addition of the final portion of RO-60, propylene glycol (1.33 moles, 101.47 g) was added to the reactor, the steam condenser was started, nitrogen sparging was increased to 0.50 liter per minute, and the temperature controller was set at 160° C. The 160° C. temperature was achieved 17 minutes later. After 2 hours at 160° C., the temperature controller was set at 205° C. and this temperature was achieved 15 minutes later. After 5 hours at the 205° C. reaction temperature, the reactor was cooled to 165° C. and 100 ppm of hydroquinone were added. The modified unsaturated polyester was recovered as a transparent, light yellow-colored solid with a final acid number of 38.9. Mass balance calculations verified that essentially all of the hydrocarbon reactives and reactive ethylenically unsaturated aromatic hydrocarbons were incorporated into the polyester while the bulk of the nonreactive hydrocarbons were recovered in the Dean Stark trap.

EXAMPLE 7

Maleic anhydride (5.00 moles, 490.3 g) was added to a reactor and heated to 100° C. under a nitrogen atmosphere with stirring. Water (5.50 moles, 99.11 g) was added and induced a maximum exotherm of 135° C. two minutes later. Cooling reduced the reactor temperature to 125° C. after an additional 5 minutes. Fifteen minutes after the initial water addition, a commercial grade of resin oil designated as RO-60 (326.57 g) was added to the reactor. Capillary gas chromatographic-mass spectroscopic analysis of the RO-60 demonstrated the following composition: 63.41 weight percent esterifiable hydrocarbon reactives composed of cyclopentadiene (5.02 percent), butadiene/cyclopentadiene codimers (3.74 percent), dicyclopentadiene (50.51 percent), indene (3.25 percent), and methylcyclopentadiene/cyclopentadiene codimer (5.91 percent); 12.92 weight percent ethylenically unsaturated aromatic hydrocarbon reactives composed of styrene (11.48 percent) and vinyl toluene (1.44 percent); and 23.67 weight percent nonreactive hydrocarbons composed of ethylbenzene (0.13 percent), xylenes (1.52 percent) naphthalene (0.18 percent), trimethylbenzenes, di- and triethylbenzenes, methylethylbenzenes, and the like. A maximum exotherm of 139° C. occurred 3 minutes later. Cooling reduced the reactor temperature to 125° C. A second portion of RO-60 (326.57 g) was added 15 minutes after the initial RO-60 addition. A final portion of RO-60 (326.57 g) was added 15 minutes later and the 125° C. reaction temperature was reachieved 4 minutes later. Thirty minutes after the addition of the final portion of RO-60, ethylene glycol (3.00 moles, 186.18 g) was added to the reactor, the steam condenser was started, nitrogen sparging was increased to 0.75 liter per minute, and the temperature controller was set at 160° C. The 160° C. temperature was achieved 29 minutes later. After 2 hours at 160° C., the temperature controller was set at 205° C. and this temperature was achieved 22 minutes later. After 10 hours, a total of 102 ml of water layer and 145 ml of organic material were collected in the Dean Stark trap. The reactor was cooled to 165° C. and 100 ppm of hydroquinone were added. The modified unsaturated polyester was recovered as a transparent, light yellow-colored solid with a final acid number of 25.1.

EXAMPLE 8

Maleic anhydride (5.00 moles, 490.3 g) was added to a reactor and heated to 100° C. under a nitrogen atmosphere with stirring. Water (5.50 moles, 99.11 g) was added and induced a maximum exotherm of 135° C. two minutes later. Cooling reduced the reactor temperature to 125° C. after an additional 5 minutes. Fifteen minutes after the initial water addition, a commercial grade of resin oil designated as RO-60 (326.57 g) was added to the reactor. The composition of the RO-60 was identical to that delineated in Example 7. A maximum exotherm of 139° C. occurred 3 minutes later. Cooling reduced the reactor temperature to 125° C. A second portion of RO-60 (326.57 g) was added 15 minutes after the initial RO-60 addition. A final portion of RO-60 (326.57 g) was added 15 minutes later and the 125° C. reaction temperature was reachieved 4 minutes later. Thirty minutes after the addition of the final portion of RO-60, ethylene glycol (2.70 moles, 167.56 g) and piperazine (0.30 mole, 25.84 g) were added to the reactor, the steam condenser was started, nitrogen sparging was increased to 0.75 liter per minute, and the temperature controller was set at 160° C. The 160° C. temperature was achieved 22 minutes later. After 2 hours at 160° C., the temperature controller was set at 205° C. and this temperature was achieved 26 minutes later. After 10 hours, a total of 100 ml of water layer and 169 ml of organic material were collected in the Dean Stark trap. The reactor was cooled to 165° C. and 100 ppm of hydroquinone was added. The modified unsaturated polyesteramide was recovered as a transparent, light yellow-colored solid with a final acid number of 18.5.

Blends of norbornyl modified unsaturated polyesters and/or polyesteramides with vinyl ester resins used in this invention are taught by Ser. No. 411,178 filed Aug. 25, 1982. The blended resin can be prepared by the following procedures.

RESIN A

Bisphenol A is catalytically reacted with a glycidyl polyether of bisphenol A having an EEW of 186-192 (polyether A) at 150° C. under a nitrogen atmosphere for 1 hour to form a polyepoxide having an EEW of 535. After cooling to 110° C., additional diglycidyl ether of bisphenol A (EEW=186-192) is added with methacylic acid and hydroquinone and reacted to a carboxyl content of about 2-2.5 percent. Then maleic anhydride is added to and reacted with the vinyl ester resin. The final resin, diluted with styrene, has a pH of 7.7 and contains approximately:

| Contents | % |
|---|---|
| bisphenol A | 7.7 |
| diglycidyl ether of bis A (EEW = 186-192) | 36.7 |
| methacrylic acid | 9.15 |
| maleic anhydride | 1.45 |
| styrene | 45 |
| | 100.00 |

RESIN B

About 1 equivalent of methacrylic acid is reacted with 0.75 equivalent of an epoxy novolac having an epoxide equivalent weight (EEW) of 175-182 and 0.25 equivalent of a glycidyl polyether of bisphenol A having an EEW of 186-192. The above reactants are heated to 115° C. with catalyst and hydroquinone present until the carboxylic acid content reaches about 1 percent. The reactants are cooled and then styrene (containing 50 ppm of t-butyl catechol) is added. The final resin diluted with styrene has a pH of 7.7 and contains approximately:

| Contents | % |
|---|---|
| styrene | 36 |
| methacrylic acid | 20.6 |
| epoxy novolac (EEW = 175-182) | 32.1 |
| diglycidyl ether of bis A (EEW = 186-192) | 11.3 |
| | 100.00 |

EXAMPLE 1

(Part A)

Maleic anhydride (7.0 moles, 686.42 grams) is added to a reactor and heated to 100° C. under a nitrogen atmosphere. Water (7.10 moles, 127.94 grams) is added. The reaction is cooled to 121° C. 98 percent dicyclopentadiene (2.10 moles, 277.64 grams) is added 15 minutes after the water is added. The reactor is cooled to a 120° C. and a second aliquot of 98 percent dicyclopentadiene (2.10 moles, 277.64 grams) is added. A final aliquot of 98 percent dicyclopentadiene (2.10 moles, 277.64 grams) is added. Later, propylene glycol (3.78 moles, 287.66 grams) and piperazine (0.420 mole, 36.18 grams) are added to the reactor and the steam condenser is started, nitrogen sparging is increased and the temperature controller is set at 160° C. Fifteen minutes separate each addition of dicyclopentadiene. After 2 hours at 160° C., the temperature controller is set at 205° C. After 14 hours, 100 milliliters of a water layer and 26 milliliters of organic material are collected. The reactor is cooled to 168° C. and 100 ppm of hydroquinone are added. The modified unsaturated polyesteramide alkyd is recovered as a clear, light yellow colored solid with a final acid number of 18.8.

(Part B)

A portion of the modified unsaturated polyesteramide alkyd and Resin A which has a styrene component and styrene are formulated as follows to provide the indicated weight percent of each component:

| Modified Polyesteramide Alkyd (grams/wt %) | Resin A (grams[a]/wt %[b]) | Styrene (grams/wt %[c]) |
|---|---|---|
| 164.5/47.0 | 50.9/8.0 | 134.6/45.0 |
| 136.5/39.0 | 101.8/16.0 | 111.7/45.0 |
| 108.5/31.0 | 152.7/24.0 | 88.8/45.0 |
| Comparative Standards | | |
| 192.5/55.0 | none | 157.5/45.0 |
| none | 192.5/55.0 | 157.5/45.0 |

[a]Total Resin A, less styrene.
[b]Active Resin A in formulation
[c]Total styrene in formulation.

(Part C)

Portions of the modified unsaturated polyesteramide alkyd, Resin B, which has a styrene component, and styrene are formulated as follows to provide the indicated weight percent of each component:

| Modified Polyesteramide Alkyd (grams/wt %) | Resin A (grams[a]/wt %[b]) | Styrene (grams/wt %[c]) |
| --- | --- | --- |
| 189.0/54.0 | 54.7/10.0 | 106.3/36.0 |
| 154.0/44.0 | 109.4/20.0 | 86.6/36.0 |
| 119.0/34.0 | 164.1/30.0 | 66.9/36.0 |
| 35.0/10.0 | 295.3/54.0 | 19.7/36.0 |
| none | 350.0/64.0 | none/36.0 |
| Comparative Standards | | |
| 224.0/64.0 | none | 126.0/36.0 |
| none | 224.0/64.0 | 126.0/36.0 |

[a]Total Resin B, less styrene.
[b]Active Resin B in formulation
[c]Total styrene in formulation.

EXAMPLE 2

(Part A)

Maleic anhydride (7.0 moles, 686.42 grams) was added to a reactor and heated to 120° C. under a nitrogen atmosphere. Water (7.10 moles, 127.94 grams) was added. The reactor was cooled to 122° C. Dicyclopentadiene concentrate (278.70 grams) was added 15 minutes after the water was added. (The dicyclopentadiene concentrate contained 0.31 percent lights, 13.64 percent cyclopentadiene codimers and diolefin dimers, and 86.05 percent dicyclopentadiene.) The reactor was cooled to 120° C. A second aliquot of dicyclopentadiene concentrate (278.70 grams) was added. A final aliquot of dyclopentadiene concentrate was added. Fifteen minutes separate each addition of dicyclopentadiene. Later, propylene glycol (3.78 moles, 278.66 grams) and piperazine (0.420 mole, 36.18 grams) were added to the reactor and the steam condenser was started, nitrogen sparging was increased and the temperature controller was set at 160° C. After 2 hours at 160° C., the temperature controller was set at 205° C. After 8.5 hours, 156 milliliters of water layer and 62.5 milliliters of organic material were collected. The reactor was cooled to 168° C. and 100 ppm of hydroquinone were added. The modified unsaturated polyesteramide alkyd was recovered as a clear, light yellow colored solid with a final acid number of 28.4.

A portion of the modified unsaturated polyesteramide alkyd was used to prepare a 30.0 percent styrene-70.0 percent alkyd solution. Then 250 grams of this solution and 250 grams of Resin B, with styrene, were mixed to provide a solution.

EXAMPLE 3

(Part A)

Maleic anhydride (8.0 moles, 784.48 grams) was added to a reactor and heated to 70° C. under a nitrogen atmosphere. Water (4.2 moles, 75.68 grams) was added, followed 2 minutes later by dicyclopentadiene concentrate (159.15 grams). The dicyclopentadiene concentrate was the same as that used in Example 2. Additional dicyclopentadiene concentrate (159.15 grams) and water (25.23 grams) were later added to the reactor. A third aliquot of dicyclopentadiene concentrate (159.15 grams) was added. Later, a final aliquot of dicyclopentadiene concentrate (159.15 grams) was added and the temperature controller was set at 110° C. Fifteen minutes separated each addition of dicyclopentadiene. Later, propylene glycol (474.86 grams) was added to the reactor and the steam condenser was started, nitrogen sparging was increased and the temperature controller was set at 160° C. After 2 hours at 160° C., the temperature controller was set at 205° C. 188.5 Milliliters of water layer and 21.0 milliliters of organic material were collected. The reactor was cooled to 165° C. and 100 ppm of hydroquinone were added. The modified unsaturated polyester alkyd was recovered as a clear, light yellow solid with a final acid number of 30.3.

EXAMPLE 4

(Part A)

A dicyclopentadiene modified unsaturated polyesteramide alkyd was prepared using the method of Example 1.

(Part B)

A portion of the modified unsaturated polyesteramide alkyd, Resin B (which has a styrene component), and styrene are formulated as follows to provide the indicated weight percent of each component:

| Modified Polyesteramide Alkyd (grams/wt %) | Resin A (grams[a]/wt %[b]) | Styrene (grams/wt %[c]) |
| --- | --- | --- |
| 325.0/50.0 | 101.56/10.0 | 223.44/40.0 |
| 260.0/40.0 | 203.13/20.0 | 186.87/40.0 |
| Comparative Standards | | |
| 370.5/57.0 | none | 279.5/43.0 |

[a]Total Resin B, less styrene.
[b]Active Resin B in formulation
[c]Total styrene in formulation.

All of the above patents and applications are incorporated herein by reference.

Vinyl ester resins (VER) are the reaction product of about equivalent amounts of a monounsaturated monocarboxylic acid and a polyepoxide. One class of VER is described in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of VER from monocarboxylic acids such as acrylic and methacrylic acid. Bowen also describes alternate methods of preparation wherein a glycidyl methacrylate or acrylate is reacted with the sodium salt of a dihydric phenol such as bisphenol A. VER based on epoxy novolac resins are described in U.S. Pat. No. 3,301,743 to Fekete et al. Fekete et al. described VER where the molecular weight of the polyepoxide is increased by reacting a dicarboxylic acid with the polyepoxide resin as well as acrylic acid, etc. in U.S. Pat. No. 3,256,226. Other difunctional compounds containing a group which is reactive with an epoxide group, such as an amine, mercaptan and the like, may be utilized in place of the dicarboxylic acid. All of the above-described resins, which contain the characteristic linkages.

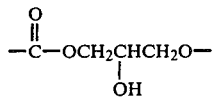

and terminal polymerizable vinylidene groups are classified as VER and are incorporated by reference.

Briefly, any of the known polyepoxides may be employed in the preparation of the vinyl ester resins of this invention. Useful polyepoxides are glycidyl polyethers of both polyhydric alcohols and polyhydric phenols, such as the diglycidyl ether of bisphenol A; epoxy novolacs; epoxidized fatty acids or drying oil acids; epoxidized diolefins, epoxidized di-unsaturated acid esters as well as epoxidized unsaturated polyester, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2000. The polyepoxides may be nuclearly substituted with halogen, preferably bromine. These polyepoxides are usually made by reacting at least about two moles of any epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group per molecule, i.e., a 1,2-epoxy equivalency greater than one.

Ethylenically unsaturated monomers suitable for blending with the thermosettable resin compositions include both the alkenyl aromatic monomers such as styrene, vinyl toluene, t-butylstyrene, chlorostyrene, α-methylstyrene, divinylbenzene, mixtures thereof and the like and the alkyl and hydroxyalkyl esters of acrylic acid and methacrylic acid such as methyl methacrylate, ethylacrylate, propylacrylate, sec-butylacrylate, n-butylacrylate, cyclohexylacrylate, dicyclopentadienyl acrylate, hydroxyethyl acrylate, hydroxypropylmethacrylate, trimethylolpropane triacrylate, trimethylolpropane trimethacrylate, pentaerythritol trimethacrylate, mixtures thereof and the like. Most any vinyl monomer may be employed which is copolymerizable with the unsaturated groups of the thermosettable resin composition.

An ethylenically unsaturated monomer or mixture of said monomers as described above may also be used alone to prepare the compositions of the present invention.

Polymer concrete is a composition made by blending of a curable component (unsaturated thermosettable resins and/or ethylenically unsaturated monomer blend) and an aggregate component. The polymer concrete composition of the present invention is prepared by blending from about 2 percent to about 20 percent by weight of a thermostable resin and/or ethylenically unsaturated monomer composition with from about 75% to about 97.9 percent by weight of an aggregate component and from about 0.1 to about 5 percent by weight of a water absorbent polymer. The components may be blended together in any order, however, it is preferred to preblend the aggregate component and the water absorbent polymer composition prior to addition of the unsaturated thermosettable resin and/or ethylenically unsaturated monomer composition.

The aggregate component is typically sand, gravel, crushed stone or rock, silica flour, fly ash, and the like or mixtures thereof. Up to about 50 percent by weight of metal fines, glass fibers, synthetic fibers, glass reinforcing mats, metal turnings, metal fibers, hydrated alumina, ceramic beads and the like or mixtures thereof may be present in the aggregate composition. The exact components used in the aggregate composition are generally dictated by the physical properties required of the cured polymer concrete composition. Thus, optimal aggregate particle size distribution and physical configuration can be determined by simple preliminary experiments.

Moisture absorbent polymers suitable for use herein are set forth in U.S. Pat. Nos. 2,988,539; 3,247,171; 3,357,067; 3,393,168; 3,514,419; 3,926,891; 3,954,721; 3,980,663; 3,993,616; 3,997,484; and 4,076,673. These patents are incorporated herein by reference.

The unsaturated thermosettable resin and/or ethylenically unsaturated monomer-absorbent polymer mixtures are curable by known catalyst systems. Peroxides, such as methyl ethyl ketone peroxides, can be used with or without known promoters, such as cobalt octoate or cobalt naphthenate, that function with such peroxides. Acyl peroxides, such as benzoyl peroxides can be used with or without promoters such as tertiary amines, including typically dimethyl aniline and N,N-dimethyl-p-toluidine. The concentrations of catalyst and promoter are adjusted within known limits of from about 0.1 to 3.0 weight percent depending on the rate of cure desired, the magnitude of the generated exotherm and for other known purposes. Suitable gelation retarding agents, such as p-benzoquinone, can be employed in the curing system.

The primer composition of the present invention is prepared by mixing from about 1 percent to about 50 percent by weight of a water absorbent polymer with from about 99 percent to about 50 percent by weight of an unsaturated thermosettable resin and/or ethylenically unsaturated monomer composition. Said primer composition is typically applied to the concrete (or other) surface directly prior to application of a polymer concrete or a polymer concrete additionally containing a water absorbent polymer composition. The primer composition may be left uncured prior to application of a polymer concrete or it may be partially or totally cured prior to said application using the aforementioned known catalyst systems. Depending on the type of water absorbent polymer composition used, its particle size distribution, the amount used and other known variables, the primer composition can be adjusted in consistency to become a suspension, a paste, a thin free-flowing liquid and the like. The primer composition of the present invention provides enhanced adhesion to concrete surfaces, especially where the surface is damp or wet. The primer composition is not well suited for underwater applications.

PREPARATION 1

Dicyclopentadiene Modified Unsaturated Polyesteramide (Resin A)

A dicyclopentadiene modified unsaturated polyesteramide resin was prepared in a 100 gallon, 316 stainless steel reactor. The reactor was equipped with mechanical stirring, flow meter controlled inlet lines and associated valving for nitrogen, water, dicyclopentadiene (96 percent), propylene glycol-piperazine solution and styrene. The respective liquid reactants were metered into the reactor from individual drums using calibrated drum pumps. A scale was used to monitor the weight loss from each drum during pumping. Heating and cooling were provided to the reactor jacket via a recirculating pump for the heat transfer fluid. Heat was provided to the heat transfer fluid reservoir via a pair of thermostated in-line electric heaters. Finned cooling coils with a water curtain provided for rapid cooling when activated. The reactor overhead section was fitted with a manway for charging solid maleic anhydride briquettes or hydroquinone and a steam-jacketed condensor. A chilled, water condensor and knock-out pot fitted with a drain valve were used to recover condensate from the steam-jacketed condensor. Product was recovered from the reactor through a ram valve into a 10 micron filter assembly and to a valved drumming outlet.

The following reaction stoichiometry was used:
maleic anhydride: 183.7 pounds
water: 18.5 pounds
dicyclopentadiene (96%): 223.1 pounds
11.17% wt. piperazine in propylene glycol solution: 86.8 pounds
hydroquinone
    addition 1: 5.6 grams
    addition 2: 58.9 grams
styrene: 372.4 pounds
The following reaction sequence was used:

| Reaction Step | Cumulative Reaction Time |
| --- | --- |
| Water addition started into 70° C. stirred solution of maleic anhydride and hydroquinone (addition 1) under 0.2 Std. Cubic Ft/Hour (scfh) scfh nitrogen | 0 minutes |
| Dicyclopentadiene addition started | 2 minutes |
| Water and dicyclopentadiene additions completed | 1 hour 45 minutes |
| Hydrolysis reaction completed (% dicyclopentadiene/acid number = 1.9%/273) | 4 hours 40 minutes |
| Piperazine-propylene glycol solution added temperature controller set at 160° C., nitrogen sparge set to 2 scfh | 4 hours 45 minutes |
| Reaction at 160° C. completed (acid number = 139) | 8 hours 35 minutes |
| Temperature set at 205° C. Nitrogen sparge set at 1.4 scfm | 8 hours 45 minutes 17 hours 35 minutes |
| Reaction at 205° C. completed and cooling started (acid number = 27.5) | 22 hours 35 minutes |
| Hydroquinone (addition 2), 2% O₂ in N₂ started | 24 hours 5 minutes |
| Styrene added at 110° C. | 25 hours 5 minutes |
| Styrenated resin drummed[1] | 26 hours |

[1]Contained 43 percent by weight styrene

PREPARATION 2

Dicyclopentadiene Modified Unsaturated Polyesteramide with Flexibilizing Glycol Ether Component (Resin B)

A dicyclopentadiene modified unsaturated polyesteramide was prepared in a 100 gallon, 316 stainless steel reactor. The reactor was equipped with mechanical stirring, flow meter controlled inlet lines and associated valving for nitrogen, dicyclopentadiene concentrate, propylene glycol-piperazine-polypropoxylate of glycerin solution, and styrene. The dicyclopentadiene concentrate contained 99.23 esterifiable hydrocarbon reactives including 81.4 percent by weight (pbw) dicyclopentadiene 11.86 pbw isoprene-cyclopentadiene codimer, 0.16 pbw tricyclopentadiene, and 0.59 pbw methylcyclopentadiene-cyclopentadiene codimer. The respective liquid reactants were metered into the reactor from individual drums using calibrated drum pumps. A scale was used to monitor the weight loss from each drum during pumping. Heating and cooling were provided to the reactor jacket via a recirculating pump for the heat transfer fluid. Heat was provided to the heat transfer fluid reservoir via a pair of thermostated in-line electric heaters. Finned cooling coils with a water curtain provided for rapid cooling when activated. The reactor overhead section was fitted with a manway for charging solid maleic anhydride briquettes or hydroquinone and a steam-jacketed condensor. A chilled water condensor and knock-out pot fitted with a drain valve were used to recover condensate from the steam-jacketed condensor. Product was recovered from the reactor through a ram valve into a 10 micron filter assembly and to a valved drumming outlet.

The following reaction stoichiometry was used:
maleic anhydride: 144.2 pounds
water: 29.1 pounds
dicyclopentadiene concentrate: 175.5 pounds
72.64% wt. polypropoxylate of glycerin, and 4.34% wt.
    piperazine in propylene glycol solution: 175.1 pounds
hydroquinone
    addition 1: 5.6 grams
    addition 2: 58.9 grams
styrene: 372.4 pounds
The following reaction sequence was used:

| Reaction Step | Cumulative Reaction Time |
| --- | --- |
| Water addition started into 70° C. stirred solution of maleic anhydride and hydroquinone (addition 1) under 0.38 scfh nitrogen | 0 minutes |
| Dicyclopentadiene concentrate addition started | 2 minutes |
| Water and dicyclopentadiene concentrate additions completed | 2 hours |
| Hydrolysis reaction completed (acid number = 259) | 4 hours 45 minutes |
| Piperazine-propylene glycol-glycerin polypropoxylate solution added, temperature controller set at 160° C., nitrogen sparge set to 2 scfh | 5 hours |
| Reaction at 160° C. completed and temperature set at 205° C. | 7 hours 45 minutes |
| Nitrogen sparge set at 2.8 scfm | 15 hours 45 minutes |
| Reaction at 205° C. completed and cooling started (acid number = 27) | 19 hours 45 minutes |
| Hydroquinone (addition 2), 2% O₂ in N₂ started | 20 hours 40 minutes |
| Styrene added at 110° C. | 22 hours 40 minutes |
| Styrenated resin drummed[1] | 25 hours 10 minutes |

[1]Contained 43 percent by weight styrene

PREPARATION 3

Resin Oil Modified Unsaturated Polyesteramide (Resin C) Prepared by the Prehydrolysis Method A resin oil modified unsaturated polyesteramide resin was prepared in a 100 gallon 316 stainless steel reactor. The reactor was equipped with mechanical stirring, flow meter controlled inlet lines and associated valving for nitrogen, water, resin oil, ethylene glycolpiperazine solution and styrene. The resin oil used contained 63.06 percent by weight (pbw) esterifiable hydrocarbon reactives consisting of isoprene-cyclopentadiene codimer (1.65 pbw), indene (4.03 pbw), methyl cyclopentadiene-cyclopentadiene codimer (6.17 pbw), butadiene-cyclopentadiene codimer (5.32 pbw) and dicyclopentadiene (45.89 pbw); ethylenically unsaturated aromatic hydrocarbon reactives consisting of styrene and vinyl toluenes (15.96 pbw); cyclopentadiene (1.56 pbw); and non-reactive hydrocarbons (19.42 pbw). The respective liquid reactants were metered into the reactor from individual drums being calibrated drum pumps. A scale was used to monitor the weight loss from each drum during pumping. Heating and cooling were provided to the reactor jacket via a recirculating pump for the heat transfer fluid. Heat was provided to the heat transfer fluid reservoir via a pair of thermostated in-line electric heaters. Finned cooling coils with a water curtain provided for rapid cooling when activated. The reactor overhead section was fitted with a manway for charging solid maleic anhydride briquettes or hydroquinone and a steam-jacketed condensor. A chilled water condensor and knock-out pot fitted with a drain valve were used to recover condensate from the steam-jacketed condensor. Product was recovered from the reactor through a ram valve into a 10 micron filter assembly and to a valved drumming outlet.

The following reaction stoichiometry and sequence were used:

| Reaction Step | Cumulative Reaction Time |
|---|---|
| Water addition (31 pounds at 1.9 gph) started into 100° C. stirred solution of maleic anhydride (169 lbs.) under 0.375 scfh nitrogen | 0 minutes |
| First 31 pounds of water in, start bulk addition of second 31 pounds of water | 1 hour 45 minutes |
| All water added, reaction temperature between 90–110° C., start recycling water and hydrocarbon distillate back into reactor | 1 hour 50 minutes |
| Start resin oil addition (320.1 pounds at 0.66 gpm) | 2 hours |
| Resin oil addition completed temperature controller set at 135° C. | 2 hours 55 minutes |
| Hydrolysis reaction completed, recycle of water and hydrocarbon distillate into reactor stopped (acid number = 218) | 4 hours 55 minutes |
| Piperazine-ethylene glycol solution (66.7 pounds) added, temperature controller set at 160° C., nitrogen sparge set to 7.5 scfh, 2,5-di-tert-butyl-hydroquinone (12.6 grams) added as process inhibitor | 5 hours 50 minutes |
| Reaction at 160° C. completed, temperature controller set at 205°0 C. | 7 hours 50 minutes |
| (acid number = 120) 205° C. reached | 10 hours |
| Nitrogen sparge set at 2.75 scfm | 11 hours 40 minutes |
| Reaction at 205° C. completed, cooling started, turn nitrogen sparge down to 0.375 scfh | 15 hours 30 minutes |
| Hydroquinone (58.9 grams) added at 150° C. (acid number = 27) | 16 hours 40 minutes |
| 2% $O_2$ in $N_2$ started at 125° C. | 17 hours 15 minutes |
| Styrene (372.4 pounds) added at 110° C. | 18 hours |
| Styrenated resin drummed[1] | 19 hours 30 minutes |

[1] Contained 43 percent by weight styrene

PREPARATION 4

Resin Oil Modified Unsaturated Polyesteramide (Resin D) Prepared by the Staged Hydrolysis Method A resin oil modified unsaturated polyesteramide resin was prepared using the equipment described in Preparation 3. The resin oil used contained 57.85 percent by weight (pbw) esterifiable hydrocarbon reactives consisting of isoprene-cyclopentadiene codimer (2.93 pbw), indene (2.58 pbw), methylcyclopentadiene-cyclopentadiene codimer (4.42 pbw), butadiene-cyclopentadiene codimer (4.0 pbw) and dicyclopentadiene (43.92 pbw); ethylenically unsaturated aromatic hydrocarbon reactives (16.57 pbw) consisting of styrene (15.67 pbw) and vinyl toluenes (0.90 pbw); cyclopentadiene (6.82 pbw); and non-reactive hydrocarbons (18.76 pbw).

The following reaction stoichiometry and sequence were used:

| Reaction Step | Cumulative Reaction Time |
|---|---|
| Water addition (32.4 pounds at 1.9 gph) started into 70° C. stirred solution of maleic anhydride (160.2 pounds) under 0.20 scfh nitrogen | 0 minutes |
| Start resin oil addition (332.2 pounds at 0.35 gpm) | 2 minutes |
| Resin oil and water additions completed, temperature controller set at 120° C. | 1 hour 45 minutes |
| Hydrolysis reaction completed, temperature at 118° C. (acid number = 247.5) | 3 hours 10 minutes |
| Piperazine-ethylene glycol solution (63.14 pounds) added, temperature controller set at 160° C., nitrogen sparge set to 5.3 scfh | 3 hours 30 minutes |
| Reaction at 160° C. completed, temperature controller set at 205° C. (acid number = 121) | 6 hours 30 minutes |
| 205° C. reached | 8 hours 50 minutes |
| Nitrogen sparge set at 1.4 scfh (acid nnumber = 41) | 11 hours 30 minutes |
| Reaction at 205° C. completed, cooling started, turn nitrogen sparge down to 0.375 scfh (acid number = 38) | 13 hours |
| Hydroquinone (58.9 grams) added at 145° C., 2% $O_2$ in $N_2$ started | 14 hours 30 minutes |
| Styrene (372.4 pounds) added at 116° C. | 20 hours 15 minutes |

The styrenated resin was drummed after all product was observed to be in solution. The resin contained 43 percent by weight styrene.

PREPARATION 5

Methyl methacrylate (Monomer Blend E)

Monomer grade methyl methacrylate (203.3 grams) and trimethylolpropane trimethacrylate (10.70 grams) were mixed together to give a 95/5 percent by weight blend.

PREPARATION 6

Absorbent Polymer A

A copolymer containing 52.0 mole percent ethyl acrylate, 28.0 mole percent sodium methacrylate and 20.0 mole percent sodium acrylate as a 25% solution in water is crosslinked using Polycup 172 (Hercules) then dried and cured to provide Absorbent Polymer A. The polymer was ground to a powder which passed through a 48 mesh standard sieve. The powder was dried at 110° C. for 60 minutes before using in a polymer concrete formulation.

PREPARATION 7

Absorbent Polymer B

The sodium salt of a crosslinked copolymer of acylamide and acrylic acid was prepared in the manner set forth in U.S. Pat. No. 3,247,171. The copolymer contained 30 mole percent of sodium acrylate, 70 mole percent acylamide, and 500 ppm of methylene bis(acrylamide). The copolymer was ground to a powder which passed through a 48 mesh standard sieve. The powder was dried at 110° C. for 60 minutes before using in a polymer concrete formation.

EXAMPLE 1

A. Dry Compressive Bond Strength of Polymer Concrete Containing Resin A and Absorbent Polymer A A pair of compressive strength test pieces were prepared using a modification of standard method ASTM C882 wherein the polymer concrete formulation was poured onto a concrete cylinder with a sandblasted 30 degree (from the horizon) angle face. Each concrete cylinder was contained in a plastic cylinderical mold.

A 185.7 gram portion of Resin A was catalyzed using 0.30 percent by weight (pbw) N,N-dimethylaniline and 1.00 pbw benzoyl peroxide. Then 1300 grams of a 49.4/25.3/25.3 pbw mixture of rock/number 3 blasting sand/number 4 blasting sand and 13.0 grams of Absorbent Polymer A were thoroughly mixed and then stirred into the resin solution. The rock used herein ranged in size from ⅜ to ¼ inch. The resulting polymer concrete was split into two equivalent aliquots which were used to prepare duplicate compressive strength test pieces.

A tamping rod and vibrator were used to pack the cylindrical molds containing the concrete cylinder with a 30 degree face with the polymer concrete and assist in removal of bubbles before gelation. After post curing for five days at room temperature (25° C.), the 3-inch diameter by 6-inch cylindrical compressive strength test pieces were demolded and tested by loading along their longitudinal axes at a loading rate of 20,000 psi per minute until failure occurred. The ultimate load was divided by the circular cross-sectional area to determine the compressive bond strength of each sample. The average of the duplicate compressive bond strength values is given in Table I.

B. Wet Compressive Bond Strength of Polymer Concrete Containing Resin A and Absorbent Polymer A The method of Example 1-A was repeated except that each concrete cylinder contained in a plastic cylindrical mold was immersed under water for three hours. The water was then poured off each cylinder five minutes prior to adding the polymer concrete. The average of the duplicate compressive bond strength values is given in Table I.

CONTROL 1

A. Dry Compressive Bond Strength of Polymer Concrete Containing Resin A

The method of Example 1-A was repeated except that no absorbent polymer was used in the polymer concrete. The average of the duplicate compressive bond strength values is given in Table I.

B. West Compressive Bond Strength of Polymer Concrete Containing Resin A

The method of Example 1-B was repeated except that no absorbent polymer was used in the polymer concrete. The average of the duplicate compressive bond strength values is given in Table I.

TABLE I

|  | Compressive Bond Strength (psi) |
|---|---|
| Example 1-A | 4351 |
| Example 1-B | 3566 |
| Control 1-A | 3522 |
| Control 1-B | 2214 |

The polymer concrete of Resin A containing Absorbent Polymer A (Example 1-A) exhibited the highest compressive bond strength of the series. The polymer concretes of Resin A containing Absorbent Polymer A exhibited significantly higher dry and wet compressive bond strengths versus the polymer concretes of Resin A alone (Examples 1-A and 1-B versus Controls 1-A and 1-B).

EXAMPLE 2

A. Wet Compressive Bond Strength of Polymer Concrete Containing Resin B and Using a Resin B-Absorbent Polymer A Primer A pair of compressive strength test pieces were prepared using a modification of standard method ASTM C882 wherein the polymer concrete formulation was poured onto a concrete cylinder with a sandblasted 30 degree angle face. Each concrete cylinder contained in a plastic cylindrical mold was immersed under water for three hours. The water was then poured off each cylinder.

A primer consisting of 1.25 grams of Absorbent Polymer A suspended in 25.0 grams of Resin B was painted onto the wet face of each concrete cylinder. A 185.7 gram portion of Resin B was catalyzed using 0.30 pbw N,N-dimethylaniline and 1.00 pbw benzoyl peroxide. Then 1300 grams of a 49.4/25.3/25.3 pbw mixture of rock/number 3 blasting sand/number 4 blasting sand were stirred into the resin solution. The rock used herein ranged in size from ⅜ to ¼ inch. The resulting polymer concrete was split into two equivalent aliquots which were used to prepare duplicate compressive strength test pieces five minutes after applying the aforementioned primer and using the method of Example 1-A. The 3-inch diameter by 6-inch cylindrical compressive strength test pieces were tested using the method of Example 1-A. The average of the duplicate compressive bond strength values is given in Table II.

CONTROL 2

A. Wet Compressive Bond Strength of Polymer Concrete Containing Resin B and Using a Resin B Primer The method of Example 2-A was repeated, except that a primer consisting of 25.0 grams of Resin B and no absorbent polymer was used on the wet face of each concrete cylinder. The average of the duplicate compressive bond strength values is given in Table II.

B. Wet Compressive Bond Strength of Polymer Concrete Containing Resin B

The method of Example 2-A was repeated, except that no primer was used on the wet face of each concrete cylinder. The average of the duplicate compressive bond strength values is given in Table II.

C. Dry Compressive Bond Strength of Polymer Concrete Containing Resin B

The method of Example 2-A was repeated except that each concrete cylinder contained in a plastic cylindrical mold was not immersed under water but was used dry and no primer was used on the dry face of each concrete cylinder. The average of the duplicate compressive bond strength values is given in Table II.

TABLE II

|  | Compressive Bond Strength (psi) |
| --- | --- |
| Example 2-A | 4274 |
| Control 2-A | 3666 |
| Control 2-B | 2888 |
| Control 2-C | 4422 |

The polymer concrete of Resin B using a Resin B-Absorbent Polymer A primer (Example 2-A) exhibited significantly increased compressive bonding strength to the wet concrete surface when compared to the polymer concrete of Resin B using a Resin B primer (Control 2-A) or the polymer concrete of Resin B without any primer (Comparative Experiment 2-B). The polymer concrete of Resin B using a Resin B-Absorbent Polymer A primer (Example 2-A) provided a compressive bonding strength on wet concrete approaching that of the polymer concrete of Resin B on dry concrete (Control 2-C).

EXAMPLE 3

A. Wet Compressive Bond Strength of Polymer Concrete Containing Resin C and Absorbent Polymer A A pair of compressive strength test pieces were prepared using a modification of standard method ASTM C882 wherein the polymer concrete formulation was poured onto a concrete cylinder with a sandblasted 30 degree angle face. Each concrete cylinder contained in a plastic cylindrical mold was immersed under water for twenty-four hours. The water was then poured off each cylinder two minutes prior to adding the polymer concrete.

A 185.7 gram portion of Resin C was catalyzed using 0.30 percent by weight (pbw) N,N-dimethylaniline and 1.00 pbw benzoyl peroxide. Then 1300 grams of a 49.4/25.3/25.3 pbw mixture of rock/number 3 blasting sand/number 4 blasting sand and 13.0 grams of Absorbent Polymer A were thoroughly mixed and then stirred into the resin solution. The rock used herein ranged from $\frac{3}{8}$ to $\frac{1}{4}$ inch. The resulting polymer concrete was split into two equivalent aliquots which were used to prepare duplicate compressive strength test pieces. A tamping rod and vibrator were used to pack the cylindrical molds with the polymer concrete and assist in removal of bubbles before gelation. After post curing for two hours at 75° C., the 3-inch diameter by 6-inch cylinderical compressive strength test pieces were demolded and tested using the method of Example 1-A. The average of the duplicate compressive bond strength values is given in Table III.

B. Wet Compressive Bond Strength of Polymer Concrete Containing Resin C and Absorbent Polymer B The method of Example 3-A was repeated except that 13.0 grams of Absorbent Polymer B was substituted for Absorbent Polymer A. The average of the duplicate compressive bond strength values is given in Table III.

CONTROL 3

A. Dry Compressive Bond Strength of Polymer Concrete Containing Resin C

A pair of compressive strength test pieces were prepared using a modification of standard method ASTM C882 wherein the polymer concrete formulation was poured onto a concrete cylinder with a sandblasted 30 degree angle face. Each concrete cylinder was contained in a plastic cylindrical mold.

A 185.7 gram portion of Resin C was catalyzed using 0.30 percent by weight (pbw) N,N-dimethylaniline and 1.00 pbw benzoyl peroxide. Then 1300 grams of a 49.4/25.3/25.3 pbw mixture of rock/number 3 blasting sand/number 4 blasting sand were thoroughly mixed and then stirred into the resin solution. The rock used herein ranged for $\frac{3}{8}$ to $\frac{1}{4}$ inch. The resulting polymer concrete was split into two equivalent aliquots which were used to prepared duplicate compressive strength test pieces. A tamping rod and vibrator were used to pack the cylinderical molds with the polymer concrete and assist in removal of bubbles before gelation. After post curing for two hours at 75° C., the 3-inch diameter by 6-inch cylinderical compressive strength test pieces were demolded and tested using the method of Example 1-A. The average of the duplicate compressive bond strength values is given in Table III.

B. Wet Compressive Bond Strength of Polymer Concrete Containing Resin C

The method of Example 3-A was repeated except that no absorbent polymer was used in the polymer concrete. The average of the duplicate compressive bond strength values is given in Table III.

TABLE III

| | Compressive Bond Strength (psi) |
|---|---|
| Example 3-A | 3295 |
| Example 3-B | 2352 |
| Control 3-A | 2931 |
| Control 3-B | 2152 |

The polymer concrete of Resin C containing Absorbent Polymer A (Example 3-A) exhibited the highest compressive bond strength of the series, even exceeding that of the dry compressive bond strength control (Control 3-A). The polymer concrete of Resin C containing Absorbent Polymer B (Example 3-B) provided a wet compressive bond strength higher than that of the wet compressive bond strength control (Control 3-B).

EXAMPLE 4

Dry Compressive Bond Strength of Polymer Concrete Containing Resin D and Absorbent Polymer B A pair of compressive strength test-pieces were prepared using the method of Example 1-A except that 185.7 grams of Resin D was substituted for Resin A and 13.0 grams of Absorbent Polymer B was substituted for Absorbent Polymer A. The average of the duplicate compressive bond strength values is given in Table IV. Each polymer concrete-concrete cylinder was easily lifted from its plastic mold after post-curing was completed.

CONTROL 4

Dry Compressive Bond Strength of Polymer Concrete Containing Resin D

The method of Example 4 was repeated except that no absorbent polymer was used in the polymer concrete. The average of the duplicate compressive bond strength values is given in Table IV. Each polymer concrete-concrete cylinder was difficult to demold and the plastic cylinderical molds had to be cut and peeled away after post-curing was completed.

TABLE IV

| | Compressive Bond Strength (psi) |
|---|---|
| Example 4 | 4592 |
| Control 4 | 2927 |

The polymer concrete of Resin D containing Absorbent Polymer B (Example 4) exhibited significantly higher dry compressive bond strength than the polymer concrete of Resin D alone (Control 4).

EXAMPLE 5

A. Dry Compressive Bond Strength of Polymer Concrete Containing Monomer Blend E and Absorbent Polymer A A pair of compressive strength test pieces were prepared using a modification of standard method ASTM C882 wherein the polymer concrete formulation was poured onto a concrete cylinder with a standblasted 30 degree angle face. Each concrete cylinder was contained in a plastic cylinderical mold.

A 214.0 gram portion of Monomer Blend E was catalyzed using 0.60 percent by weight (pbw) N,N-dimethyltoluidine and 1.2 pwb benzoyl peroxide. Then 1500 grams of a 49.4/25.3/25.3 pbw mixture of rock/number 3 blasting sand/number 4 blasting sand, 45.0 grams of poly(methylmethacrylate) and 13.0 grams of Absorbent Polymer A were thoroughly mixed and then stirred into the monomer blend solution. The rock used herein ranged in size from ⅜ to ¼ inch. The resulting polymer concrete was split into two equivalent aliquots which were used to prepare duplicate compressive strength test pieces. A tamping rod and vibrator were used to pack the cylinderical molds with the polymer concrete and assist in removal of bubbles before gelation. After post curing for two hours at 75° C., the 3-inch diameter by 6-inch cylinderical compressive strength test pieces were demolded and tested using the method of Example 1-A. The average of the duplicate compressive bond strength values is given in Table V.

B. Wet Compressive Bond Strength of Polymer Concrete Containing Monomer Blend E and Absorbent Polymer A The method of Example 5-A was repeated except that each concrete cylinder contained in a plastic cylinderical mold was immersed under water for twenty-four hours. The water was then poured off each cylinder two minutes prior to adding the polymer concrete. The average of the duplicate compressive bond strength values is given in Table V.

C. Dry Compressive Bond Strength of Polymer Concrete Containing Monomer Blend E and Absorbent Polymer B The method of Example 5-A was repeated except that 13.0 grams of Absorbent Polymer B was substituted for Absorbent Polymer A. The average of the duplicate compressive bond strength values is given in Table V.

D. Wet Compressive Bond Strength of Polymer Concrete Containing Monomer Blend E and Absorbent Polymer B The method of Example 5-B was repeated except that 13.0 grams of Absorbent Polymer B was substituted for Absorbent Polymer A. The average of the duplicate compressive bond strength values is given in Table V.

CONTROL 5

Wet Compressive Bond Strength of Polymer Concrete Containing Monomer Blend E

The method of Example 5-B was repeated except that no absorbent polymer was used in the polymer concrete. The average of the duplicate compressive bond strength values is given in Table V.

TABLE V

| | Compressive Bond Strength (psi) |
|---|---|
| Example 5-A | 4214 |
| Example 5-B | 3376 |
| Example 5-C | 3904 |
| Example 5-D | 3328 |
| Control 5 | 2072 |

The polymer concretes of Monomer Blend E containing Absorbent Polymer A (Example 5-B) and Absorbent Polymer B (Example 5-D) exhibited significantly higher wet compressive bond strengths versus the polymer concrete of Blend E alone (Control 5).

We claim:

1. A curable polymer concrete composition which comprises (A) about 2 to about 20 weight percent of an unsaturated thermosettable composition containing about 1 to about 100 weight percent of one or more ethylenically unsaturated monomers and 0 to about 99 weight percent of one or more ethylenically unsaturated resins, (B) about 75 to about 97.9 weight percent of an aggregate comprising at least 50 percent by weight of a component selected from the group consisting of sand, gravel, crushed stone or rock, silica flour, fly ash, or mixtures thereof, and (C) about 0.1 to 5 weight percent of a water absorbent cross-linked polymer.

2. The curable polymer concrete composition of claim 1 wherein the amount of thermosettable composition is about 8 to about 15 weight percent, the amount of said aggregate is about 83 to about 91 weight percent, and the amount of said absorbent polymer is from about 1 to about 2 weight percent.

3. The curable polymer concrete composition of claim 1 wherein said unsaturated resin is selected from the group consisting of
(A) ethylenically unsaturated polyester resins,
(B) ethylenically unsaturated polyesteramide resins,
(C) norbornyl modified unsaturated polyester resins,
(D) norbornyl modified unsaturated polyesteramide resins,
(E) hydrocarbon modified unsaturated polyester resins prepared from a resin oil
(F) hydrocarbon modified unsaturated polyesteramide resins prepared from a resin oil
(G) vinyl ester resins, and
(H) mixtures of A–G.

4. The cured polymer concrete composition of claim 1.

5. The cured polymer concrete composition of claim 2.

6. The cured polymer concrete composition of claim 3.

* * * * *

UNITED STATES PATENT AND TRADEMARK OFFICE
CERTIFICATE OF CORRECTION

PATENT NO. : 4,611,015

DATED : September 9, 1986

INVENTOR(S) : Robert E. Hefner, Jr. and Deborah I. Haynes

It is certified that error appears in the above-identified patent and that said Letters Patent is hereby corrected as shown below:

Col. 2, line 49; change "3,360,634;" to --4,360,634;--.

Col. 10, line 68; delete the period "." after "ages".

Col. 12, line 7; change "aggregrate" to --aggregate--.

Col. 15, line 21; change "being" to --using--.

Col. 15, line 68, under heading "Reaction Step" of Table; change "205°0C" to --205°C--.

Col. 16, line 59, under heading "Reaction Step" of Table; change "nnumber" to --number--.

Col. 18, line 23; change "West" to --Wet--.

Col. 20, line 50; change "for" to --from--.

Col. 20, line 52; change "prepared" to --prepare--.

Col. 21, line 22; change "test-pieces" to --test pieces--.

UNITED STATES PATENT AND TRADEMARK OFFICE
CERTIFICATE OF CORRECTION

PATENT NO. : 4,611,015

DATED : September 9, 1986

INVENTOR(S) : Robert E. Hefner, Jr. and Deborah I. Haynes

It is certified that error appears in the above-identified patent and that said Letters Patent is hereby corrected as shown below:

Col. 21, line 61; change "standblasted" to --sandblasted--.

Col. 21, line 66; change "pwb" to --pbw--.

Signed and Sealed this

Eighth Day of September, 1987

Attest:

DONALD J. QUIGG

*Attesting Officer*  *Commissioner of Patents and Trademarks*